Patented Aug. 17, 1954

2,686,798

UNITED STATES PATENT OFFICE 2,686,798

METAL COMPLEXES OF ALIPHATIC DIAMINES

George T. Gmitter, Chicago, Ill., assignor to Armour and Company, Chicago, Ill., a corporation of Illinois No Drawing. Application June 7, 1952, Serial No. 292,395

13 Claims. (Cl. 260—429)

The present invention relates to new chemical compounds, more particularly to molecular complexes of bivalent metallic salts, and to methods of preparing the same.

The novel compounds of the present invention are characterized as having a metal nucleus existing in salt form, the metal atom of the salt being a part of a chemically stable 6-membered ring structure having a long chain aliphatic substituent. The metal nucleus referred to is bound into the ring structure by coordination linkages of the Werner type. Conveniently, the structure of these novel compounds may be represented as follows:

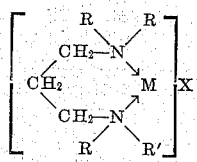

in which M is a metal having 2 primary valences, X is an anionic group, R is either hydrogen or methyl, and R' is a long chain aliphatic group. The above complexes, particularly those having a mercury nucleus, are especially useful as bactericides, fungicides, and the like.

The complex compounds of the present invention are believed to be true molecular complexes, as distinguished from the so-called "lattice compounds" and loosely bound aggregations of molecules. In other words, there is considered to be a definite chemical combination, in the present complexes, between the organic portion and the metal nucleus. The ability of this arrangement to resist cleavage is favored by the inherent stability of the 6-membered ring configuration. Moreover, the long chain aliphatic group provides water insolubility.

The compounds of the present invention may be readily formed by reacting a long chain aliphatic trimethylene diamine and a bivalent metal salt. In the preferred practice the diamine and metal salt are reacted in the presence of a suitable liquid solvent until the desired complex is formed. The diamine acts as a chelating group and coordination is effected through amino groups to form a 6-membered ring structure with the metallic nucleus. The individual reacting molecules, although capable of independent existence by themselves, become firmly joined in 1:1 ratio, thereby forming a new stable complex molecule.

The nature of the new compounds and a preferred mode of their preparation, may be illustrated in the case of the specific complex designated as N-octadecyl trimethylene diaminomercuric chloride: 5.43 g., representing 0.02 mol., of anhydrous mercuric chloride are dissolved in 75 ml. of 95% aqueous ethanol. To this solution, 6.52 grams, representing 0.02 mol. of N-octadecyl trimethylene diamine, dissolved in 100 ml. of warm 95% aqueous ethanol, are added with stirring. The product, N-octadecyl trimethylene diaminomercuric chloride, which comes down as a colorless precipitate, is formed immediately. The precipitate may be conveniently isolated by cooling the reaction mixture and filtering. The filter cake, which consists of the desired product, is washed first with separate portions of distilled water, then with 95% alcohol, and is finally dried. The product is colorless, melts at 117 to 119° C., and is insoluble in water and in 95% alcohol.

The method of bringing the reactants together may be varied as desired. Preferably, the metal salt and diamine may be first dissolved separately in portions of a suitable solvent and the separate portions then combined, or, as is also preferred, an equimolar mixture of the diamine and metal salt may be dissolved in a suitable solvent and subjected to reaction. The order of combining the reactants is not critical. In the preparation of the mercury complexes in accordance with the present invention, it is advantageous to add the diamine solution to the mercury salt solution. Reverse addition, i. e., addition of mercury salt solution to diamine solution, is undesirable since it results to some extent in reduction of the mercury salt.

In accordance with the preferred practice of the present invention, equimolar amounts of the reactants, i. e., a substituted trimethylene diamine and metal salt, are employed. The yield of product resulting from the interaction between equimolar amounts is almost quantitative with the result that isolation of the desired product merely involves separating the product from the solvent employed. On the other hand, if an excess (i. e., more than equimolar amount) of either reactant is employed, isolation of the desired product involves the further step of separating the product from the excess amount of reactant used.

The reaction may be carried out without special apparatus. It may be conducted in any convenient vessel adapted to contain the reactants. The reaction proceeds spontaneously merely by mixing or contacting the reactants in the presence of moderate heat. To facilitate contact it is desirable to dissolve the reactants in a suitable liquid solvent which is a mutual solvent for the reactants, i. e., a solvent which will dissolve each of the reactants. Preferably, the solvent should not enter into, or interfere with, the desired reaction. It is important that the solvent be substantially anhydrous. Generally, solvents having a minor proportion of water are suitable, as, for example, 95% aqueous ethanol. Various low molecular weight organic solvents will be suitable for the reaction, in particular the lower alcohols and ketones and the lower homologs of benzene, and the like. Mixtures of such solvents may likewise be employed.

According to the preferred practice, the reaction is favored with a moderate amount of heat, although it is quite satisfactory to conduct the reaction at room temperature. Higher and lower temperatures may be employed, but at relatively high temperatures there is an undesirable tendency toward breakdown of complex formed. It is advisable to agitate and stir the reaction mixture until the reaction is substantially completed.

There is considerable variation in the length of time required for completion of the reaction. In some cases the reaction is completed almost instantaneously while in other cases several hours are required for completion of the reaction. In any case, it will be clear that it is not necessary to react all of the reacting materials in order to obtain a satisfactory product. In other words, the reaction may be terminated as soon as the desired quantity of product is obtained.

Following the desired reaction the product may be isolated from the reaction zone by any suitable method. For example, the reaction mixture may be cooled so as to cause precipitation or crystallization of the product and the mixture then filtered or decanted to isolate the product. Also, it will be satisfactory to evaporate the solvent and thereby leave the desired product as a residue.

Various substituted trimethylene diamines may be employed as starting materials in the practice of the present invention. In general, any trimethylene diamine compound one of whose amino hydrogens is replaced by a long chain aliphatic group having from 5 to 20 carbon atoms, will serve. Additionally, amines of the type just mentioned, having one or more of the residual amino hydrogens replaced by a methyl group, will also serve. These diamines may be represented structurally as $RR'N-(CH_2)_3-NR^2$ wherein R is either a hydrogen or methyl radical and R' is a straight chain aliphatic group having from 5 to 20 carbon atoms. As representative of suitable N-substituted trimethylene diamine compounds the following may be mentioned: N-amyl, N-hexyl, N-octyl, N-decyl, N-dodecyl, N-dodecenyl, N-tetradecyl, N-tetradecenyl, N-hexadecyl, N-hexadecenyl, N-octadecyl, N-octadecenyl, N-octadecadienyl, N-eicosyl, and N-eicosenyl.

Mixtures of diamine compounds may also be employed, particularly mixtures of diamines derived from naturally-occurring fats and oils, such as soybean oil, coconut oil, tallow, and the like. Examples of preferred diamine mixtures are N-tallow trimethylene diamine (derived from tallow and in which "tallow" comprises a mixture of the following aliphatic radicals: dodecyl, tetradecyl, tetradecenyl, hexadecyl, hexadecenyl, octadecyl, octadecenyl, octadecadienyl, eicosyl, and eicosenyl); N-coco trimethylene diamine (derived from coconut oil and in which "coco" comprises a mixture of octyl, decyl, dodecyl, tetradecyl, hexadecyl, octadecyl, octadecenyl, and octadecadienyl radicals); and N-soya trimethylene diamine (derived from soybean oil and in which "soya" comprises a mixture of hexadecyl, octadecyl, octadecenyl, and octadecadienyl radicals). Hereinafter, the terms "tallow," "coco," and "soya" are meant to refer to the respective mixtures of radicals set forth.

Also applicable to the present invention as indicated above, are the polysubstituted N-aliphatic trimethylene diamines having at least one N-substituted (also referred to herein as amino substituted) methyl group, as for example, N-aliphatic-N-methyl trimethylene diamine, N-aliphatic-N'-methyl trimethylene diamine, N-aliphatic-N,N'-bis(methyl)-trimethylene diamine, N-aliphatic-N',N'-bis(methyl)trimethylene diamine, and N-aliphatic-N,N',N'-tris(methyl)trimethylene diamine.

Various bivalent metal salts are useful in the preparation of my new compounds. In general, I may use the chloride, bromide, iodide, fluoride, sulphate, nitrate, propionate, or acetate of any bivalent metal. For example, I may be use salts of copper, chromium, barium, palladium, tin, vanadium, zinc, cadmium, mercury, manganese, iron, cobalt, and nickel. The use of the salts of mercury, zinc, and copper is preferred, particularly mercuric chloride, mercuric acetate, zinc acetate, and cupric acetate. The suitable metal salts may be represented structurally as $M=X$ wherein M is one of the metals set forth and X is either (halide)$_2$, (nitrate)$_2$, (acetate)$_2$, (propionate)$_2$, or sulphate.

The present invention embraces all of the complex metal salts of the type set out which may be formed by the interaction of any one of the above-mentioned substituted trimethylene diamine compounds with any one of the above-mentioned bivalent metallic salts in accordance with the above preferred method or other suitable methods.

The following examples will illustrate preferred modes of carrying out the present invention:

EXAMPLE I

*N-tallow trimethylene diaminocalcium chloride*

15.4 grams of N-tallow trimethylene diamine and 5.55 grams of anhydrous calcium chloride are dissolved in sufficient anhydrous ethanol to produce a slight turbidity. The solution is heated for one-half hour at the boiling point of the mixture and filtered to remove the small amount of insoluble material. The excess ethanol is evaporated to isolate the complex: a colorless, amorphous product decomposing at 140° C.

EXAMPLE II

*N-tallow trimethylene diaminomercuric chloride*

15.5 grams of N-tallow trimethylene diamine and 13.6 grams of mercuric chloride are dissolved in separate quantities of ethanol. The quantities are then combined with stirring and allowed to stand at room temperature. The product begins to form almost immediately in the form of a precipitate. The mixture is allowed to stand for 4 hours and is filtered at the end of this time and washed with cold ethanol. The yield is almost quantitative. The product is air dried, being a colorless powder with no sharp melting point. Decomposition is observed at 145° C. The product turns a light gray color on prolonged exposure to light and is only very slightly soluble in water or 95% ethanol.

EXAMPLE III

*N-dodecyl trimethylene diaminomercuric chloride*

Anhydrous mercuric chloride (5.43 grams, 0.02 mol.) is dissolved in 75 ml. of 95% ethanol. To this solution, with stirring, is added 4.84 grams (0.02 mol.) of N-dodecyl trimethylene diamine dissolved in 100 ml. of 95% ethanol. A colorless precipitate is formed immediately. Upon filtering, the filter cake is washed a few times with distilled water by decantation and finally filtered. The dried product is a colorless crystalline material insoluble in water and 95% ethanol, melting at 135 to 138° C. with decomposition.

EXAMPLE IV

*N-amyl trimethylene diaminomercuric acetate*

6.37 grams (0.02 mol.) of anhydrous mercuric acetate is heated with 2.88 grams (0.02 mol.) of N-amyl trimethylene diamine in 100 ml. of chloroform. Upon cooling and concentrating, the product is recovered as a residue, being colorless and slightly soluble in 95% ethanol.

EXAMPLE V

*N-tallow N,N',N'-tris(methyl)trimethylene diaminomercuric acetate*

17.6 grams of N-tallow N,N',N'-tris(methyl) trimethylene diamine and 15.94 grams of anhydrous mercuric acetate are added to 150 ml. of anhydrous toluene and refluxed gently for 2 hours. A portion of the toluene is evaporated under vacuum and the resulting precipitate is filtered and washed with cold Skellysolve. The product dried in air is colorless. Recrystallization of the product from cold acetone yields colorless needles decomposing at 200° C. The product is slightly soluble in water and in 95% ethanol.

EXAMPLE VI

*N-tallow trimethylene diaminocupric acetate*

The cupric acetate diamino complex is prepared by heating equimolar quantities of N-tallow trimethylene diamine and cupric acetate dissolves in ethanol. 9.93 grams of the copper salt and 15.5 grams of N-tallow trimethylene diamine are dissolved together in 150 ml. of 95% ethanol and heated at 80° C. for 2 hours. The solvent is evaporated under vacuum, leaving a blue amorphous product, somewhat soluble in water and alcohol.

EXAMPLE VII

*N-tallow trimethylene diaminozinc acetate*

Anhydrous zinc acetate (10.97 grams) and N-tallow trimethylene diamine (15.5 grams) are separately dissolved in a minimum amount of anhydrous ethanol and combined to give a total volume of 400 ml. The solution is filtered and heated at 60 to 70° C. for 2 hours. The excess alcohol is evaporated under vacuum and the remaining solution thus concentrated is cooled. The concentrated solution is filtered and washed with a small amount of cold anhydrous alcohol. The product is a colorless amorphous solid decomposing at 220° C., slightly soluble in water and fairly soluble in 95% ethanol.

EXAMPLE VIII

*N-dodecyl trimethylene diaminonickel nitrate*

2.91 grams of nickel nitrate dissolved in 50 ml. of absolute ethanol are mixed with 2.42 grams of N-dodecyl trimethylene diamine preliminarily dissolved in 50 ml. of absolute ethanol. An insoluble green precipitate is formed almost immediately. The product is filtered, washed with absolute ethanol and the excess solvent allowed to evaporate. The product is pale green in color and decomposition begins at 210° C. It is insoluble in alcohols and water.

EXAMPLE IX

*N-dodecyl trimethylene diaminonickel sulfate*

2.63 grams of nickel sulfate are disolved in 100 ml. of absolute methanol and mixed, with stirring, with 2.42 grams of N-dodecyl trimethylene diamine dissolved in 50 ml. of absolute methanol. An insoluble precipitate is formed readily and after standing for one hour the product is filtered, washed with absolute methanol and allowed to dry. The product is light green in color and decomposition begins at 235° C.

EXAMPLE X

*N-dodecyl trimethylene diaminocalcium propionate*

1.86 grams of calcium propionate are dissolved in sufficient anhydrous ethanol and mixed with a solution of 2.42 grams of N-dodecyl trimethylene diamine in 50 ml. anhydrous ethanol and after filtering, the mixture is allowed to stand over a 24-hour period. The precipitate formed is filtered, washed with cold anhydrous ethanol and dried. The complex, a colorless product, is insoluble in ethanol and decomposition begins at 128° C.

EXAMPLE XI

*N - tallow - N,N',N' - tris(methyl)trimethylene diaminomercuric chloride*

N - tallow - N,N',N' - tris(methyl) trimethylene diamine (17.6 grams) is dissolved in 125 ml. of warm acetone and added slowly, with stirring, to 13.6 grams of mercuric chloride dissolved in 75 ml. of acetone. The solution is then concentrated under vacuum. The concentrate is cooled and filtered. The product, retained on the filter, is a colorless amorphous material decomposing at 180° C. and very slightly soluble in water and in 95% ethanol.

The compounds of the present invention have a pronounced bactericidal and fungicidal effect. Evidence of the killing power of the new compounds, in the presence of culture media and bacteria and yeasts, is set forth in the following table, the values being expressed as the number of micrograms of the compound, per cc. of culture medium, necessary for complete destruction of each culture.

| | N-tallow trimethylene diamine mercuric chloride | N-tallow N,N',N'-tris-(methyl) trimethylene diamine mercuric acetate | N-tallow trimethylene diamine zinc acetate | N-tallow trimethylene diamine cupric acetate |
|---|---|---|---|---|
| Bacteria: | Mcg./cc. | Mcg./cc. | Mcg./cc. | Mcg./cc. |
| E. coli | 100 | less than 50 | more than 500 | more than 500. |
| S. aureus | 100 | do | do | Do. |
| Sarcina lutea | less than 50 | do | 450 | Do. |
| B. polymyxa | 100 | do | more than 500 | 150. |
| B. subtilis | 100 | do | 500 | more than 500. |
| A. aerogenes | 100 | do | more than 500 | Do. |
| Serratia marcescens | 100 | do | do | Do. |
| Yeasts: | | | | |
| Candida lipolytica | 100 | do | 350 | 100. |
| Hansenula californica | less than 50 | 150 | more than 500 | more than 500. |
| Torula cremoris | do | less than 50 | do | Do. |
| Zygosaccharomyces lactis | do | 150 | do | Do. |
| Sporobolomyces salmonicolor | do | less than 50 | do | less than 50. |
| Candida neoformans | do | 200 | do | more than 500. |

The new compounds are useful for preventing rot in cotton, hemp, wood, fabrics, cord, electrical insulation and the like. The complex salts of mercury are particularly effective in this respect. It is advantageous that for the most part these salts are insoluble in water and thus cannot be leached out by the action of rain or washing.

While in the foregoing specification I have set forth in considerable detail certain embodiments of the present invention it will be understood by those skilled in the art that considerable variation may be made in such detail without departing from the spirit of my invention.

I claim:
1. A compound of the formula

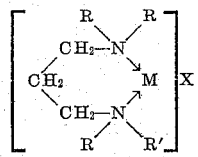

wherein R is a radical selected from the group consisting of hydrogen and methyl radicals, R' is a straight chain aliphatic radical having from 5 to 20 carbon atoms, M is a bivalent metal, and X is selected from the group consisting of (halide)2 (acetate)2, (nitrate)2, (propionate)2, and sulphate.

2. A compound of the formula

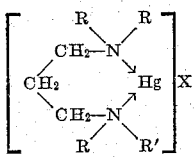

wherein R is a radical selected from the group consisting of hydrogen and methyl radicals, R' is a straight chain aliphatic radical having from 5 to 20 carbon atoms, and X is selected from the group consisting of (halide)2, (acetate)2, (nitrate)2, (propionate)2, and sulphate.

3. A tallow derivative represented by

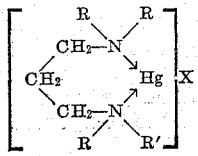

wherein R is a radical selected from the group consisting of hydrogen and methyl radicals, R' is a tallow radical, and X is selected from the group consisting of (halide)2, (acetate)2, (nitrate)2, (propionate)2, and sulphate.

4. The compound represented by

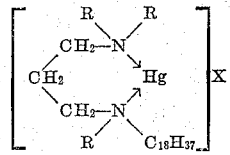

wherein R is a radical selected from the group consisting of hydrogen and methyl radicals and X is selected from the group consisting of (halide)2, (acetate)2, (nitrate)2, propionate)2, and sulphate.

5. N - tallow trimethylene diaminomercuric acetate.

6. N-octadecyl trimethylene diaminomercuric halide.

7. A compound according to claim 1 wherein M is calcium and X is (halide)2.

8. A compound according to claim 1 wherein M is bivalent copper and X is (acetate)2.

9. A compound according to claim 1 wherein M is zinc and X is (acetate)2.

10. A pest-control composition useful for controlling fungi and bacteria containing as an active ingredient a compound of the formula:

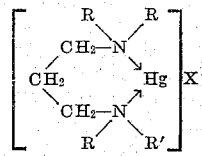

where R is a radical selected from the group consisting of hydrogen and methyl radicals, R' is a straight-chain aliphatic radical having from 5 to 20 carbon atoms, and X is selected from the group consisting of (halide)2, (acetate)2, (nitrate)2, (propionate)2, and sulfate.

11. A pest-control composition useful for controlling fungi and bacteria containing as an active ingredient N-tallow trimethylene diaminomercuric halide.

12. A pest-control composition useful for controlling fungi and bacteria containing as an active ingredient N-tallow trimethylene diaminomercuric acetate.

13. A pest-control composition useful for controlling fungi and bacteria containing as an active ingredient N-tallow-N,N',N'-tris(methyl) trimethylene diaminomercuric acetate.

(References on following page)

References Cited in the file of this patent

UNITED STATES PATENTS

| Number | Name | Date |
|---|---|---|
| 726,126 | Wichmann et al. | Apr. 21, 1903 |
| 1,919,732 | Kharasch | July 25, 1933 |
| 2,208,253 | Flenner et al. | July 16, 1940 |

OTHER REFERENCES

Bailor et al.: J. Am. Chem. Soc., vol. 68, pages 232–4 (1946).

Chem. Ab., vol. 42, page 3654.

Flusscheim: J. für Praktische Chemie (2), vol. 68, pp. 355–6 (1903).

Tschugoeff: J. für Praktische Chemie (2), vol. 76, page 89 (1907).